(12) United States Patent
Leite

(10) Patent No.: US 7,482,400 B2
(45) Date of Patent: Jan. 27, 2009

(54) FIRE-RETARDANT AGENT BASED ON POLYPHOSPHORIC OR ORTHOPHOSPHORIC ACID IMPREGNATED ON A HIGHLY POROUS MINERAL OXIDE METHOD FOR PREPARATION AND USE THEREOF

(75) Inventor: Lorraine Leite, Paris (FR)

(73) Assignee: Rhodia Consumer Specialties, Ltd., Watford (GB)

( * ) Notice: Subject to any disclaimer, the term of this patent is extended or adjusted under 35 U.S.C. 154(b) by 194 days.

(21) Appl. No.: 10/502,176

(22) PCT Filed: Jan. 24, 2003

(86) PCT No.: PCT/FR03/00238

§ 371 (c)(1),
(2), (4) Date: Jul. 21, 2004

(87) PCT Pub. No.: WO03/062312

PCT Pub. Date: Jul. 31, 2003

(65) Prior Publication Data

US 2005/0070652 A1    Mar. 31, 2005

(30) Foreign Application Priority Data

Jan. 25, 2002    (FR) .................. 02 00929

(51) Int. Cl.
*C08K 3/32* (2006.01)
*C01B 25/26* (2006.01)

(52) U.S. Cl. .......... 524/417; 252/609; 423/311
(58) Field of Classification Search .......... 252/609; 423/311; 524/417
See application file for complete search history.

(56) References Cited

U.S. PATENT DOCUMENTS 5,321,186 A * 6/1994 Honda et al. .......... 585/500

* cited by examiner

*Primary Examiner*—Peter D Mulcahy
(74) *Attorney, Agent, or Firm*—Buchanan, Ingersoll & Rooney, P.C.

(57) ABSTRACT

The invention relates to a novel fire-retardant agent based on polyphosphoric or orthophosphoric acid impregnated on a highly porous mineral oxide, method for preparation and use thereof for fire-retarding treatment of materials, in particular of polymers.

14 Claims, No Drawings

FIRE-RETARDANT AGENT BASED ON POLYPHOSPHORIC OR ORTHOPHOSPHORIC ACID IMPREGNATED ON A HIGHLY POROUS MINERAL OXIDE METHOD FOR PREPARATION AND USE THEREOF

This application is an application under 35 U.S.C. Section 371 of International Application Number PCT/FR03/00238 filed on Jan. 24, 2003.

The present invention relates to a novel fire retardant based on orthophosphoric or polyphosphoric acid impregnated on a highly porous mineral oxide, to a process for preparation thereof and to the use thereof.

Phosphorus is available in the elemental state, in the form of organic phosphate compounds or mineral acidic phosphates. All forms of phosphates are known for their uses as fire retardants in polymer systems, for instance red phosphorus for polyamides, organic phosphates in polyphenylene oxides or polyurethanes and mineral acidic phosphates in cellulose, as is described in the publication entitled "Flame Retardants" in Ullmann's Encyclopedia of Industrial Chemistry, 1988, Vol. A 11, page 125, column 2.

Thus, the use of ammonium polyphosphates as additives for improving the fire resistance of materials into which they are incorporated has been described in the document entitled "ammonium polyphosphate and its application as a flame retardant" by J. Wortmann, in "Fire retard. Proc. Eur. Conf. Flammability Fire Retard.", pages 193-196, 1st (1979).

However, the use of these compounds presents drawbacks. In particular, these compounds are expensive.

There is a need to develop novel fire retardants that do not have these drawbacks.

This is the aim of the present invention.

The Applicant has just discovered that, entirely unexpectedly, the dry impregnation of a highly porous mineral oxide with an amount of concentrated orthophosphoric or polyphosphoric acid that is sufficient to impregnate the mineral oxide, followed by drying at atmospheric pressure at a temperature of between 100 and 200° C. for at least 3 hours, followed by calcination at atmospheric pressure at a temperature of between 200° C. and 500° C. for at least 2 hours, makes it possible to obtain a novel fire retardant that has the advantage of affording highly efficient fire resistance to materials into which it is incorporated, while at the same time limiting the manufacturing cost.

The mineral oxide may be chosen from silica, alumina, silica-alumina, zirconia or titanium oxide. Silica is preferably used. This may be a precipitation silica or a combustion silica.

The mineral oxide must be highly porous. This means that its pore volume should be at least 1 ml/g and preferably at least 3 ml/g.

When the mineral oxide is silica, it may be, for example, a Tixosil 38A, Tixosil 38D, Tixosil 38 or Tixosil 365 silica from the company Rhodia.

Orthophosphoric acid, also known as monophosphoric acid, corresponds to $H_3PO_4$. The polyphosphoric acids according to the invention may be chosen from those described in the book entitled "Phosphorus an outline of its Chemistry, Biochemistry and Uses", fifth Edition, D. E. C. Corbridge, Elsevier, 1995 page 170 and 180 to 182.

Mention may be made especially of pyrophosphoric acid or diphosphoric acid of formula $H_4P_2O_7$, triphosphoric acid of formula $H_5P_3O_{10}$, the polyphosphoric acids of formula $H_{n+2}P_nO_{3n+1}$, and the metaphosphoric acids of formula $H_nP_nO_{3n}$.

As indicated on page 181 of the document "Phosphorus an outline of its Chemistry, Biochemistry and Uses" mentioned above, commercial phosphoric acid or polyphosphoric acids are characterized by their $P_2O_5$ or $H_3PO_4$ equivalent, expressed as a weight percentage.

Thus, a class of "superphosphoric" acids exists, whose $H_3PO_4$ equivalent is greater than 100. These superphosphoric acids are the preferred polyphosphoric acids.

The sufficient amount of concentrated orthophosphoric or polyphosphoric acid to be used for the impregnation preferably corresponds to the maximum amount that it is possible to impregnate on the mineral oxide, i.e. the volume for which the mineral oxide is no longer capable of absorbing the liquid orthophosphoric or polyphosphoric acid.

The impregnation is performed in dry mode, i.e. the concentrated orthophosphoric or polyphosphoric acid is added dropwise by burette in doses of 25 ml.

The drying is performed, for example, in an oven at atmospheric pressure at a temperature of between 100 and 200° C. for at least 3 hours.

Next, the impregnated mineral oxide is calcined at atmospheric pressure at a temperature of between 200° C. and 500° C. for at least 2 hours.

A subject of the present invention is also the product that may be obtained by the process for impregnating the mineral oxide with orthophosphoric or polyphosphoric acid, drying and calcination described above.

This product is obtained in the form of a powder, which may be formed according to the forming processes commonly used industrially.

A subject of the present invention is also the use of the product obtained by the process for rendering materials, and in particular polymers, fire retardant.

When the product obtained by the process is added to thermoplastic polymers such as polyamides and polyolefins, it is incorporated by mixing in an extruder to obtain granules. The mixture comprises the following constituents:

the polymer in the form of a granulate or powder;

the product obtained by the process according to the invention;

a polyalcohol, for instance pentaerythritol or dipentaerythritol, which is dehydrated under the effect of polyphosphoric acid and leads to the formation of charcoal;

a swelling agent, for instance dicyandiamide, melamine, melamine cyanurate or melamine phosphate, which decomposes while the suspension of charcoal in the polymer melt foams.

The ratio of mineral oxide impregnated with orthophosphoric or polyphosphoric acid/polyalcohol/swelling agent used in this application is between 2/1/1 and 7/1/1. A ratio of about 3/1/1 is preferably used. The total amount of these fire-retardant additives used ranges between 5% and 50% relative to the total weight of the polymer obtained. Preferably, the total amount of these fire-retardant additives is between 20% and 40% relative to the total weight of the polymer obtained.

When the mineral oxide impregnated with orthophosphoric or polyphosphoric acid is incorporated into thermosetting polymers such as polyurethane, epoxy resins (for instance araldite), polyester resins, phenolic resins (for instance bakelite) or aminoplasts (for instance formica), the mineral oxide impregnated with orthophosphoric or polyphosphoric acid and the other additives such as the swelling agent are incorporated into one of the monomers or oligomers before the polymerization or curing reaction. The amounts of mineral oxide impregnated with orthophosphoric or polyphosphoric acid used are within the same proportions as those described for the thermoplastic polymers.

Other aspects and advantages of the products that are the subjects of the invention will emerge in the light of the examples, which are given below for illustrative purposes and are in no way limiting.

A—Examples of Preparation of a Highly Porous Silica Impregnated with concentrated phosphoric acid and calcined according to the invention Example 1

Examples of Preparation of a Highly Porous Silica Impregnated with Concentrated Phosphoric Acid and Calcined according to the Invention.

The highly porous silica used is a silica known as Tixosil 38A from the company Rhodia, with a pore volume of 3.2 ml/g.

The orthophosphoric acid used is Prolabo normapur 85% $H_3PO_4$ ref. 20624295 ($MH_3PO_4$=98 g/mol, d=1.7 g/ml).

The sufficient amount of concentrated orthophosphoric acid to be used for the impregnation preferably corresponds to the maximum amount that it is possible to impregnate on the silica, i.e. the volume for which saturation of the silica is obtained.

For a mass of silica of 50 g, 3.2×50=160 ml of 85% $H_3PO_4$ will theoretically need to be used, i.e. 1.7×160=272 g of 85% $H_3PO_4$ (or 231.2 g of pure $H_3PO_4$).

The impregnation takes place in dry mode, i.e. the concentrated acid is added dropwise via a burette in 25 ml doses.

The maximum impregnated volume reached is 134 ml.

The difference between the 160 ml theoretically usable and the 134 ml used in practice arises from the viscosity of the acid, which is higher than that of water.

Next, the impregnated silica is dried in an oven at atmospheric pressure at 150° C. overnight.

Next, the impregnated silica obtained is calcined at a temperature of at least 300° C. for 2 hours.

B—Examples of Tests

The silica impregnated with orthophosphoric acid of example 1 was tested according to standard fire retardancy tests described below.

These results were compared with those obtained for a polypropylene specimen. The results are given in Table 1 below:

1) Preparation of the Polypropylene Specimens

Polypropylene alone is blended for 3 minutes at 200 rpm at 155° C. The powder containing 18% by weight of $H_3PO_4$-impregnated silica prepared in example 1 relative to the total weight of the mixture, 6% by weight of pentaerythritol relative to the total weight of the mixture and 6% by weight of melamine relative to the total weight of the mixture are then introduced into the blender and blending is continued for 3 minutes.

Thermocompression is then performed at 190° C. at 1 bar for 4 minutes, and then at 100 bar for 1 minute and at 200 bar for 1 minute, and the mixture is then cooled for 4 minutes while maintaining this pressure of 200 bar.

Standardized bars for the fire resistance tests of LOI and UL94 type are thus obtained by thermocompression.

The same operation is performed without adding impregnated silica, in order to be able to obtain comparative examples.

2) Determination of the Fire Resistance of the Specimens

Two tests were used in order to determine the fire resistance of the specimens:
  the test by means of the oxygen index, referred to hereinbelow as the "LOI" described in international standard ISO-4589-2: 1996(F); and
  the test on contact with a small flame as a source of ignition, referred to hereinbelow as "UL94" described in NF standard ISO-1210: 1992(F).

TABLE I

| Tests | Polypropylene alone | Incorporated polypropylene of example 1 |
|---|---|---|
| UL94 | not classified | VO classification |
| LOI | 17% | 31% |

The VO classification is the best in the UL94 test.

The results of the LOI "limiting oxygen index" test are expressed in percentages and indicate the minimum oxygen content required to maintain combustion. The higher this value, the more the material resists ignition.

Thus, it is found that the results obtained with the polypropylene specimen incorporated with the compound of example 1 are better than the results obtained for the untreated polypropylene specimen.

The invention claimed is:

1. A process for the dry impregnation of a highly porous mineral oxide which is silica, alumina, silica-alumina, zirconia or titanium oxide having a pore volume of at least 1 ml/g, comprising the steps of:
  a) impregnating said oxide with a sufficient amount of concentrated orthophosphoric or polyphosphoric acid, said impregnation being performed in a dry mode whereby said acid is added to said oxide,
  b) drying said oxide at atmospheric pressure at a temperature of between 100 and 200° C. for at least 3 hours, and,
  c) calcining said oxide at atmospheric pressure at a temperature of between 200° C. and 500° C. for at least 2 hours.

2. The process as claimed in claim 1, wherein the highly porous mineral oxide is a mineral oxide with a pore volume of at least 3 ml/g.

3. The process as claimed in claim 1, wherein the mineral oxide is silica.

4. The process as claimed in claim 1, wherein, in step a), the sufficient amount of concentrated orthophosphoric or polyphosphoric acid for the impregnation is the maximum amount that it is possible to impregnate on the mineral oxide, which is the volume for which the mineral oxide is no longer capable of absorbing the liquid orthophosphoric or polyphosphoric acid.

5. The process as claimed in claim 1, wherein the polyphosphoric acid is pyrophosphoric acid, diphosphoric acid of formula $H_4P_2O_7$, triphosphoric acid of formula $H_5P_3O_{10}$, polyphosphoric acids of formula $H_{n+2}P_nO_{3n+1}$, or metaphosphoric acids of formula $H_nP_nO_{3n}$.

6. The process as claimed in claim 5, wherein the polyphosphoric acid used has an $H_3PO_4$ equivalent of greater than 100.

7. A process comprising:
  providing a mineral oxide having a pore volume of at least 1 ml/g, the mineral oxide comprising silica, silica-alumina, zirconia or titania;
  impregnating the mineral oxide with orthophosphoric or polyphosphoric acid in a dry mode;

drying the impregnated mineral oxide; and
calcining the impregnated mineral oxide.

8. The process of claim 7, wherein the pore volume is at least 3 ml/g.

9. The process of claim 7, wherein the orthophosphoric or polyphosphoric acid is added to the mineral oxide in predetermined doses.

10. The process of claim 9, wherein the orthophosphoric or polyphosphoric acid is added to the mineral oxide in a dropwise manner.

11. The process of claim 7, wherein the drying is performed at 100° C.-200° C. for at least 3 hours.

12. The process of claim 11, wherein the calcining is performed at 200° C.-500° C. for at least 2 hours.

13. The process of claim 7, further comprising:
combining the impregnated mineral oxide with a polymer thereby forming a polymer-based composition.

14. The process of claim 13, wherein an amount of impregnated mineral oxide combined with the polymer is sufficient to constitute 5%-50%, by weight, of the polymer-based composition.

* * * * *